United States Patent [19]

Kakinuma et al.

[11] Patent Number: 4,962,865
[45] Date of Patent: Oct. 16, 1990

[54] INSULATING BOX AND A METHOD FOR ITS MANUFACTURE

[75] Inventors: Zenichi Kakinuma, Tochigi-Ken; Masashi Yamamoto, Gunma-Ken; Katsumi Nakada, Tochigi-Ken; Yasuo Noda, Saitama; Michihisa Hama; Masahiro Nakamura, both of Gunma, all of Japan

[73] Assignee: Sanyo Electric Co., Ltd., Osaka, Japan

[21] Appl. No.: 479,378

[22] Filed: Feb. 13, 1990

[30] Foreign Application Priority Data

Feb. 15, 1989 [JP] Japan ................. 1-36730
Mar. 1, 1989 [JP] Japan ................. 1-50495
May 9, 1989 [JP] Japan ................. 1-115608

[51] Int. Cl.$^5$ ............... B29D 27/04; B65D 25/14
[52] U.S. Cl. ............... 220/444; 220/412; 220/467; 264/46.4; 264/46.8; 264/516
[58] Field of Search ............... 220/412, 413, 411, 467, 220/444; 264/46.4, 46.9, 46.8, 516

[56] References Cited

U.S. PATENT DOCUMENTS

| | | | |
|---|---|---|---|
| 3,719,303 | 3/1973 | Kronenberger | 220/444 |
| 3,915,328 | 10/1975 | Hanes et al. | 220/444 |
| 3,942,331 | 3/1976 | Newman, Jr. et al. | 220/444 |
| 4,136,141 | 1/1979 | Bauer et al. | 264/45.2 |
| 4,541,545 | 3/1985 | Beattie et al. | 220/431 |
| 4,546,899 | 10/1985 | Williams | 264/46.8 |
| 4,747,512 | 5/1988 | Lo | 220/444 |
| 4,878,482 | 11/1989 | Pfeffer | 264/46.5 |

*Primary Examiner*—Joseph Man-Fu Moy
*Attorney, Agent, or Firm*—Darby & Darby

[57] ABSTRACT

In manufacturing an insulating box used for a low-temperature show case having a slidable transparent windows on the top opening thereof, a recess is formed on the upper front ends of inner and outer boxes of an insulating box, said recess being provided with a frame covering the gaps between said inner and outer boxes and having a groove for receiving therein a multi-layer transparent panel. After the multi-layer transparent panel is installed in the groove and fixed with a fixation frame, an expandable insulating material is injected into the spaces between said inner and outer boxes to form said insulating box.

12 Claims, 12 Drawing Sheets

INSULATING BOX AND A METHOD FOR ITS MANUFACTURE

FIELD OF THE INVENTION

The invention relates to an insulating box used for a low-temperature show case having slidable transparent doors to cover its top opening and a transparent window in the upper front wall of the case, and to a method for its manufacture.

BACKGROUND OF THE INVENTION

There have been known various methods of manufacturing an insulating box for a low-temperature show case having slidable transparent doors to cover its top opening, as shown in, for example, Japanese Patent Early Publication No. 60-165487. This Publication discloses a method of filling the spaces between the inner and outer boxes by injecting liquid state expansion insulating material into the space. In this method, if the height of a liner placed in the box during the injection of the insulating material is smaller than the height between the projecting wall of the insulating box that projects over the top opening and the opposite (bottom) wall, the injection is carried out in such a way that a gap is not formed between the liner and the wall of the insulating box.

A low-temperature show case according to the Publication is manufactured by installing a transparent window in the upper portion of one wall of the insulating box. The transparent window must be inserted into the groove formed in a plastic breaker after the expandable insulating material is filled in the space defined by the inner and outer boxes and said plastic breaker for connecting said boxes. However, the shape of the window receiving portion of the breaker is deformed as a result of outward bulging of the surfaces of the groove due to the pressure of the expanded insulating material, narrowing the mouth of the window receiving portion. Since the transparent window may not be then inserted into the narrowed groove, a process for correcting the groove of the breaker is needed before inserting the window, which is very tedious and sometimes impossible when the distortion of the groove is too great.

BRIEF SUMMARY OF THE INVENTION

In view of these disadvantages, the invention is intended to provide an improved insulating box free of the problems above and a method for its manufacture.

Another object of the invention is to provide an improved insulating box and a method for its manufacture without inducing cracks in the multi-layer transparent panel during the injection of expandable insulating material into the box, with a multi-layer transparent panel fixed in position in the box.

In carrying out these objects, the invention has a feature that an improved insulating box is constructed by injecting expandable insulating material into the space between an inner and outer boxes which are bridged with a plastic frame or breaker. (The frame is called "breaker" because it breaks the heat current between the inner and outer boxes as it firmly bridge them). The breaker is fitted in a recess of the inner and outer boxes to receive the transparent panel in the groove formed in said breaker.

According to the invention, the transparent panel is placed in the recess prior to the injection of the expandable insulating material, so that the transparent panel serves as a reinforcing member of the frame against the pressure acting thereon of the expanding insulating material during the solidification of the insulating material. Furthermore, the pressure increases strength of the contact between the transparent plate and the groove, since the pressure enhances intimacy between them.

The invention is also characterized in that the insulating box is constructed by securing the transparent panel in the groove before injecting the expandable insulating material into the space between the inner and outer boxes and the assembly of these members are preheated to a predetermined temperature (i.e. below cracking temperature) to avoid cracking of the transparent panel.

Since the assembly or the box is preheated at a temperature below the cracking temperature of the transparent panel, not only the expansion of the air is limited but the buckling of the transparent panel is limited, so that the injection and expansion of the expandable insulating material may be carried out without causing cracks in the transparent panel, eliminating the necessity of correcting the distortion of the box.

The invention is further characterized in that the insulating box of this invention has a multiplicity of transparent panels and insulating air layers between each pair of said transparent panels, and the transparent panel has a pressure adjusting passage in the transparent panel for communicating the insulating spaces with the atmosphere. In injecting the expandable insulating material into the space between the assembled inner and outer boxes, the box is preheated to a predetermined temperature and then secured on a heated jig, communicating the insulating spaces with the atmosphere.

With this pressure adjusting passage in the multi-layer transparent panel, the pressure of the air inside the panel may be balanced with the atmosphere by allowing the air to escape from the panel if the air is heated and expanded, so that the buckling of each transparent panel is reduced below cracking threshold of the transparent panel, thereby eliminating otherwise necessary corrections of deformed transparent panel.

BRIEF DESCRIPTION OF THE DRAWINGS

FIGS. 10 and 11 illustrate the method of manufacturing a low-temperature show case according to the invention. In particular.

DETAILED DESCRIPTION OF THE PREFERRED EMBODIMENT

Referring to FIGS. 1 through 8, the invention is now described in detail by way of example of a low-temperature show case.

Figure 1:
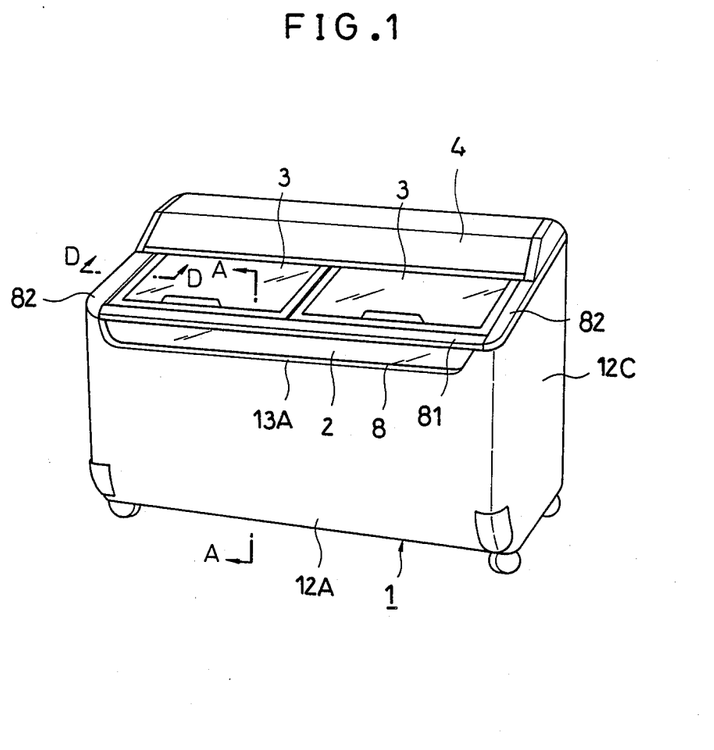
FIG. 1 is a perspective view of a low-temperature show case embodying the invention.
Figure 2:
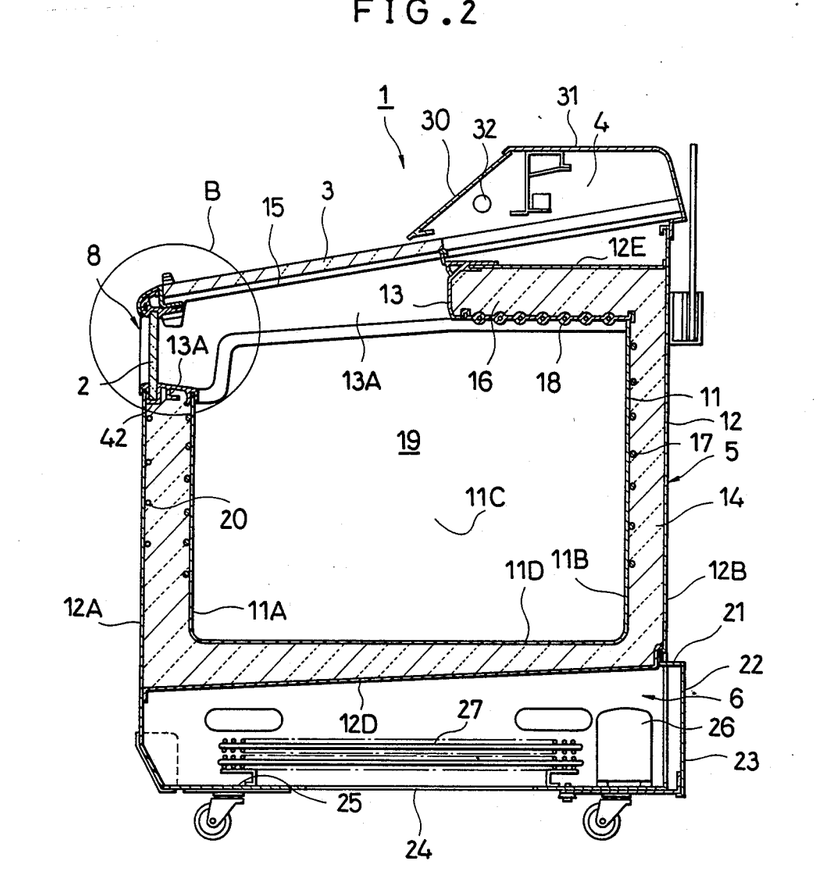
FIG. 2 is a cross section of the low-temperature show case, taken along the line A—A of FIG. 1.

An insulating box 1 as shown in FIG. 1 and FIG. 2, is intended for use with, for example, a low-temperature show case for displaying ice creams, sherbets and the like for sale. The box comprises: a transparent panel serving as a window 2 having a dew-prevention heater 2D and secured in the recess 8 formed in the upper front of the case; slidable transparent doors 3 provided on the top opening of the box; an insulation box 5 having a door storage section 4 for storing the transparent doors 3 when they are opened; and a machinery room 6 below the box 5, for accommodating components necessary for refrigeration. The insulating box 5 comprises: an inner box 11 made of metal such as melt zinc coated steel and having an upward opening for goods storage room; an outer box 12 for accommodating the inner box made of metal such as melt zinc coated steel, spaced apart from the outer box at an appropriate distance; a plastic frame 13 to cover the top opening defined by the inner and outer boxes 11, and 12; and an expandable insulating material 14 such as expanded polyurethane of closed cell type injected into and filling the space enclosed by the inner and outer boxes and the frame. The box is provided on one end thereof (which is the top of the box in this example) with an opening 15 for replenishing and taking out goods and with a projecting wall 16 projecting towards the opening 15.

Figure 3:
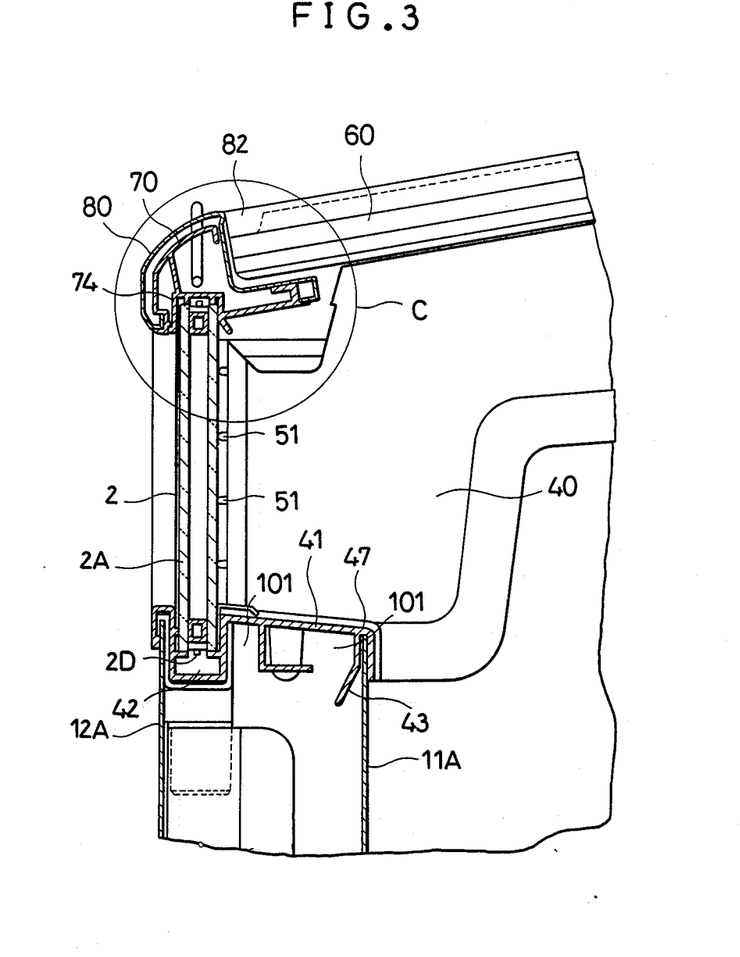
FIG. 3 is an enlarged cross section of the portion B of FIG. 2, showing the upper portion of the recess formed in the upper front of the low-temperature show case.
Figure 4:
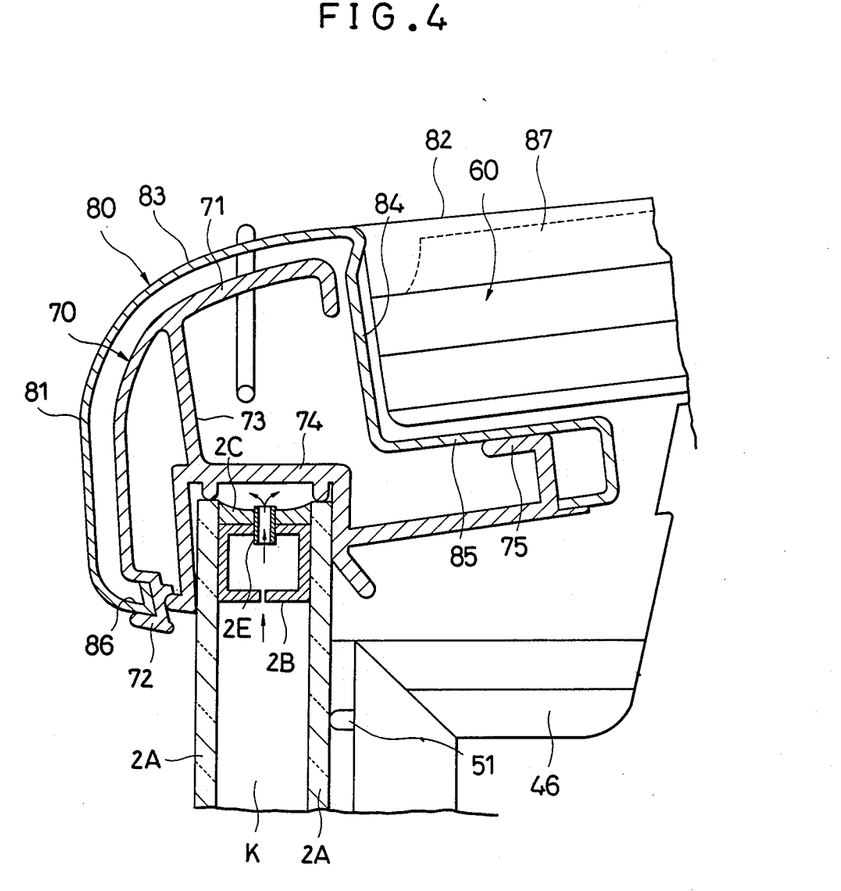
FIG. 4, is an enlarged cross section of the portion C of FIG. 3, showing the upper portion of the recess formed in the upper front of the low-temperature show case.

As seen in FIGS. 3 and 4 showing in a large scale the portions B and C of FIG. 2 and FIG. 3, respectively, the transparent panel of window 2 fitted in the recess 8 is composed of a multiplicity of transparent plates having insulation space K therebetween, forming a multi-layered panel. The multi-layer transparent panel comprises, in this example, two sheets of transparent glass 2A appropriately spaced apart with spacers 2B, the sheets 2A and the spacers 2B being fixed with each other by means of adhesive seal material 2C such as thiokol for better adhesion, and provided with a heater 2D for preventing deposition of dews. The transparent panel is also provided with an air passage 2E through the seal so that the heated air trapped and expanded in the transparent glass panel may escape to maintain the pressure therein in equilibrium with the atmosphere, preventing cracking of the glass 2A.

The above mentioned inner box 11 comprises: a front wall, a rear wall, a right and a left side walls, and a bottom wall 11A-11D, respectively, and is cooled by means of a pipe-on-sheet type main refrigeration apparatus for using evaporator 17 made from a zig-zag refrigeration pipe provided on the outer surface of the box, and a slab-shaped auxiliary refrigeration apparatus 18 made in a so-called roll bond method, having upright portions along the front, rear, right and left of the box. The front wall 11A of the inner box and the right and left side walls 11C each have steps in such a way that the level of the former step is lower than the latter ones. The outer box 12 comprises: a front wall 12A on which a heat exchanger 20 is secured by an aluminum adhesive tape; a rear wall 12B which extends higher than the front wall 12A and has a bent portion at its top end; a right and a left side wall 12C; a bottom wall 12D which is sloping upward towards the rear and has an injection hole 97 near the rear for injecting expandable insulating material 14 and appropriate number of air passages 98 near the front; and an upper wall 12E which is sloping downward towards the rear. A main zig-zag heat exchanger 20 provided on the front wall 12A for preventing deposition of dews on the wall 12A, is a continuation of a refrigeration pipe, serving as a heating element during refrigeration. An alternative electric heater may substitute for the heat exchanger for the same purpose. The front wall 11A of the outer box has a step portion 8A whose level is lower than the right and left walls 11C. The front wall 12A of the outer box has a step portion 8B whose level is lower than the right and left walls 12C. The frame 13 has a configuration such that the recess 8 is formed along the step portion 8A of the inner front wall 11A and the step 8B of the outer front wall 12A.

The machinery room 6 consists of: a lower portion of the outer box 12; lower portions of a right and a left side wall 12C; a bottom wall 2D; a removable cover 23 formed in the rear of the insulating box 5 for covering an opening for reaching mechanical components, said cover having a first upwardly directed air passage 21 at the top edge of the cover and a second horizontally directed air passage 22 below said first air passage 21; and a base 25 having an air intake 24 for intaking air into the machinery room 6. A refrigerant compressor 26 constituting a refrigeration cycle together with the main and auxiliary refrigeration apparatuses 17 and 18, is secured on the base 25. The wire-fin tube type condenser 27 is secured on a pair of supports provided at the front and rear edges of the air intake 24.

The door storage section 4 may accommodate the transparent doors when they are opened, and comprises a front plastic shade 30; a metal ceiling board 31 at the top of the box; an upper wall 12E of the outer box 12 at a level lower than the ceiling board 31; and an illumination apparatus 32 e.g. a straight fluorescent lamp for illuminating the storage room.

Figure 5:
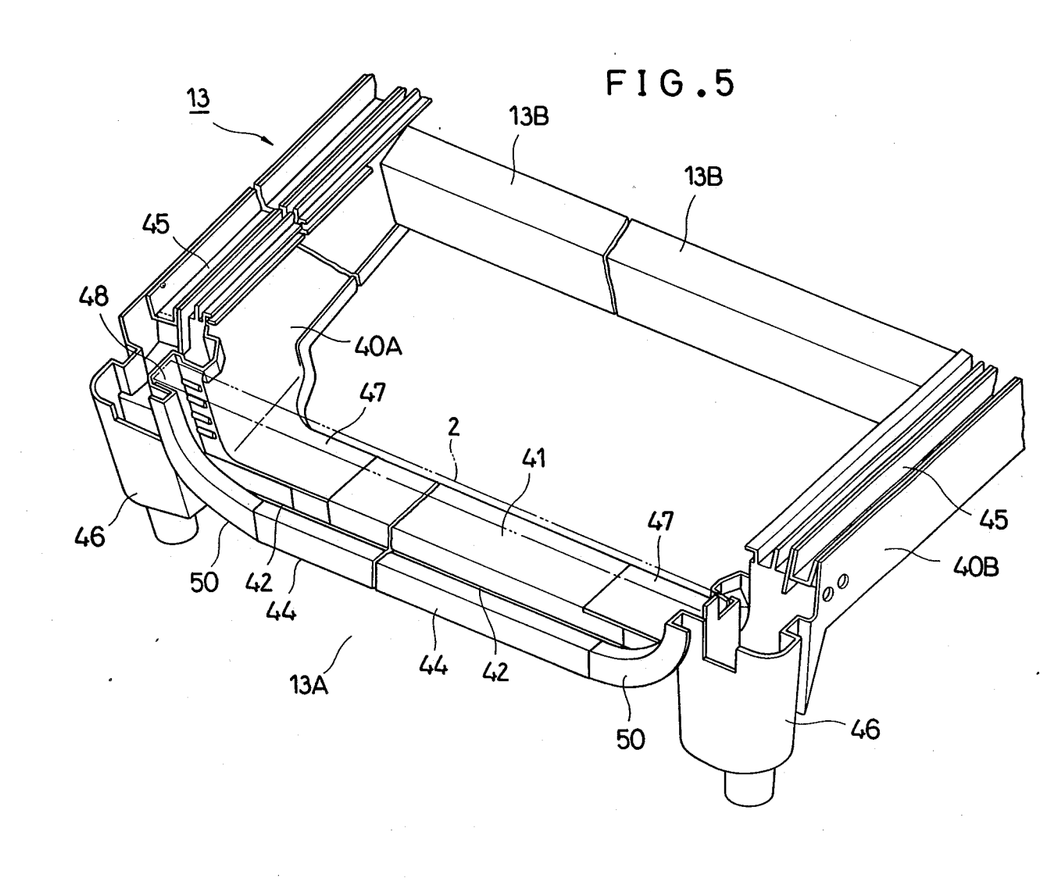
FIG. 5 is a schematic perspective view of frames provided on the upper and front portions of the low-temperature show case.
Figure 6:
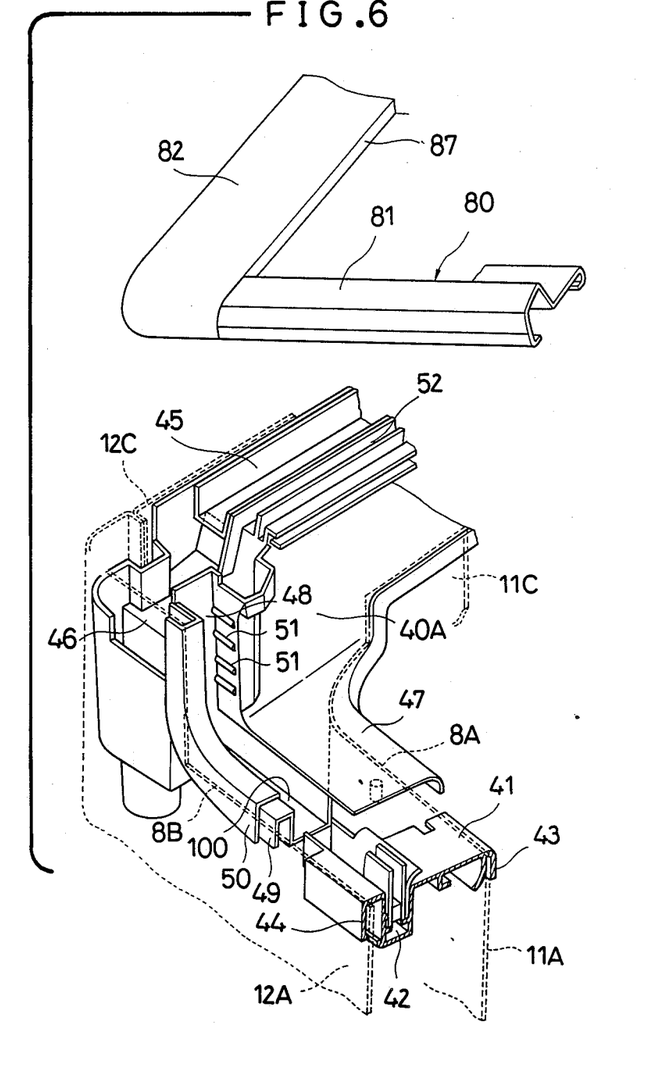
FIG. 6 is a schematic perspective view of an upper front corner of the low-temperature show case.

In order to expose the right and left square-cornered transparent panel 2 in a round shape when the panel is secured in position in the frame 13 placed in the recess 8 of the front walls of the inner and outer boxes, as shown in FIGS. 5 and 6, the frame 13 is composed of a first frame portion 13A and a second frame portion 13B in front of projecting wall 16, the front frame portion, the latter of which is further composed of three divisions. On the other hand the first frame portion 13A are composed of opposing left and right frame portions 40A and 40B, respectively, each associated with the right and left wall of the box, respectively. Since they are symmetrical in shape, only the left frame portion 40A is briefly described along with the front frame portion 41.

The recess 8 is formed with its edges surrounded with the front frame portion 41 of the first frame portion 13A and a connection portion 47. The front frame portion 41 comprises: a groove 42 in the recess for receiving the lower end of the transparent window as shown in the cross sectional view of FIG. 6; a downward insertion piece 43 into which the upper end of the front wall of the inner box is inserted; and a mounting piece 44 for connecting the right and left frame portion and receiving the front end of the outer box to serve as a window frame of the transparent window 2. The left frame portion 40A comprises: a sloped portion 45 which is climbing up backwardly; a dew receiving portion 46 formed at the front end of the sloped portion 45, for receiving dews descending the sloped portion into an opening provided in the portion 46; and a connection portion 47 separated from the dew receiving portion 46 but extending from the sloped portion so as to be connected with the front frame portion 41. The connection portion has at its front end a connection piece 49 which extends beneath the mounting piece 44 and, a style piece 50 which, when connected, becomes flush with the mounting piece 44 as a part of the window frame.

The right and left tips of the front frame portion 41 (FIG. 6) submerge under the connecting portions 47 of the right and left frame members 40A and 40B, respectively, so that the front frame portion 41 and the connecting portions 47 are flush with each other, forming the first front frame portion 13A. The groove 42 in the recess and a fixation groove 48 constitute the groove portion 100 in which the three edges of the transparent wall 2 are inserted. The groove 42 in the recess is formed to extend into the space R between the inner and outer boxes. The front frame portion 41 is provided with a portion 101 facing the space R, for receiving a portion of the expanded insulator.

Figure 7:
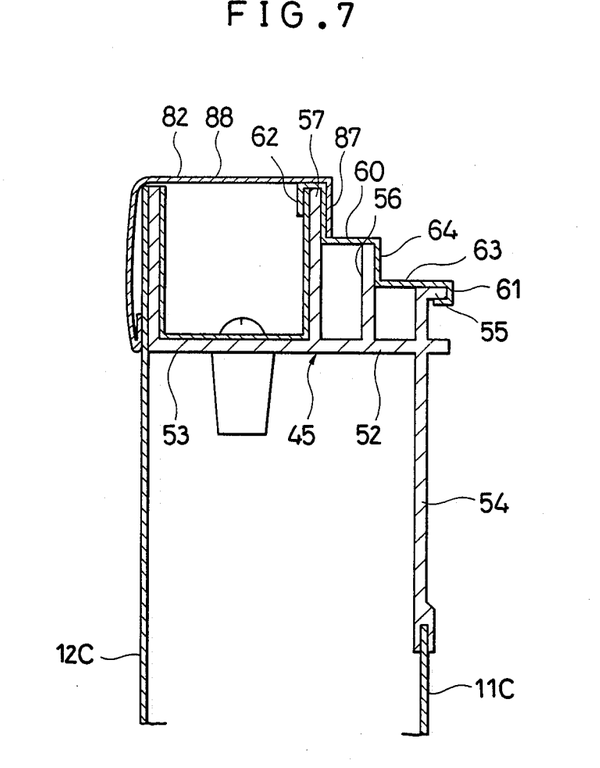
FIG. 7 is a cross sectional view of an upper, side portion of the low-temperature show case, taken along the line D—D of FIG. 1.

On the front surface of the rear wall of the fixation groove 48, a multiplicity of ribs 51 are provided to prevent rattling of the transparent window. The sloped portion 45 has: a rail receiver 52 on the upper inner surface thereof for receiving the left rail 60; an electric wire conduit 53 on the upper external surface thereof for protecting the electric wires connected with the heater in the window, the fluorescent lamp and the like; and an ear 54 formed at its inner lower end, into which the upper end of the inner box is inserted as shown in FIG. 7, a cross section taken along D—D of FIG. 1. The rail receiver 52 comprises a tip 55 for engagement with the counter tip 61 formed on one end of the left rail 60; a support 56 for supporting the lower surface of the left rail; and an upright portion 57 for supporting the engaging portion 62 formed on the other end of the left rail. The left rail 60 is provided with a floor portion 63 for slidably supporting the transparent door 3, and a limiter portion 64 for limiting the transverse deviation of the door.

Figure 8:
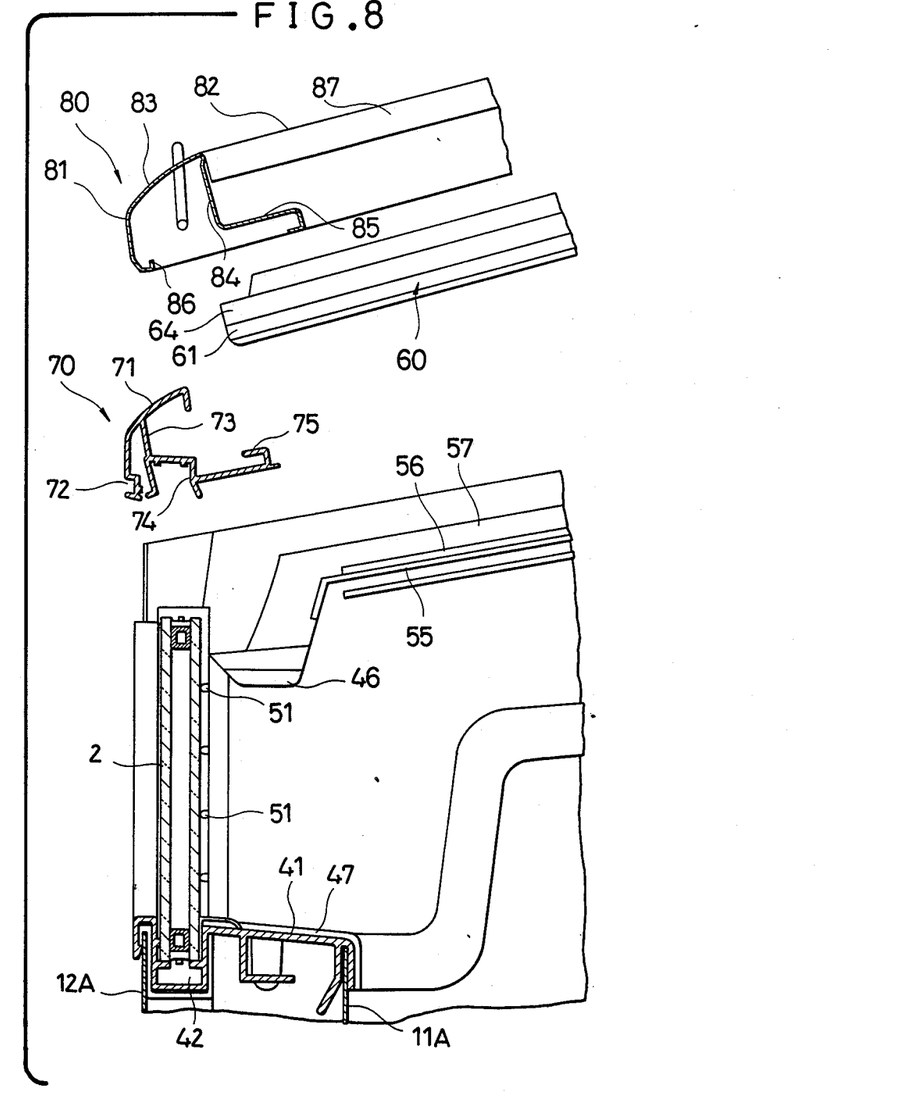
FIGS. 8 and 9 are exploded views of the upper front portion of the low-temperature show case, illustrating the mounting condition of the transparent window in the recess.
Figure 9:
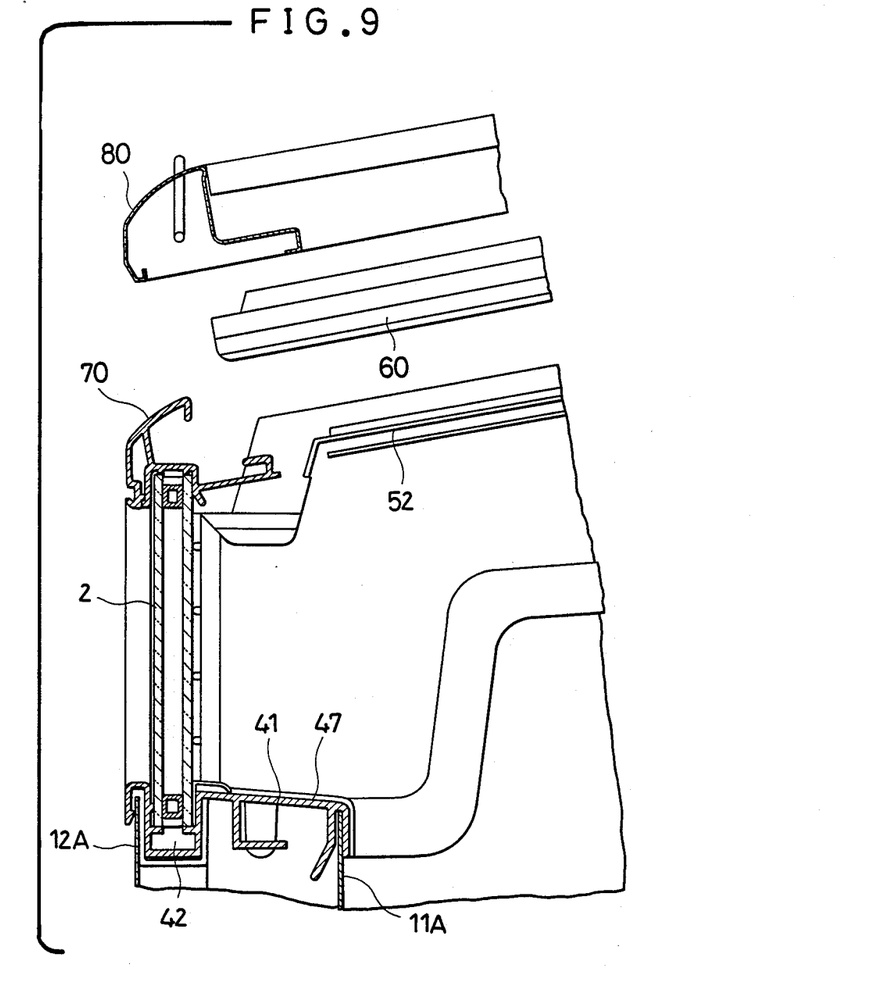

As shown in FIGS. 3, 8, and 9, a plastic window-fixation frame 70 is mounted on the front end of the box to fix the upper end of the transparent window 2 in position. The window fixation frame 70 is covered with a hand rail 80, as described later. The window fixation frame 70 comprises: a receiver 71 for receiving the lower surface of the bent portion 83 of the hand rail 80; an engaging groove 72 formed on one end of the receiver 71, to be engaged with a nail 86; a flexible depending portion 73 formed on the lower surface of the receiver 71; a window fixation groove 74 formed at the tip of the depending portion 73 so as to firmly engage with the upper end of the inserted transparent window 2 by the restoring force exerted by the fixation groove 74; and a support portion 75 for supporting the lower surface of the dew receiver 85 of the hand rail 80.

The hand rail 80, made of a rust-proof metal such as a stainless steel, comprises: a front style frame 81 to cover the window fixation frame 70; a right and a left style frames 82 to cover the right and left frame portion 40A and 40B, respectively and to forcibly secure the right and left rail 60.

The front style frame 81 comprises: a forwardly and downwardly bent portion 83; a door-abutting portion 84 depending from the rear end of the bent portion; a dew receiver 85; and a nail 86 formed on the front end of the bent portion. The right and left style frames 82 each comprises rail holders 87 for forcibly holding the respective right and left rails 60 on the inner surfaces of the frames, and covers 88 for covering right and left electric wire conduits, respectively.

The fixation of the transparent window (or the multi-layer transparent panel) is now described. The frame 13, assembled in unity, is secured on the upper ends of the inner and outer boxes 11 and 12 which have been spaced apart appropriately. The transparent window 2 is inserted in the recess with its lower end seating in the groove 42 of the front frame portion 41 and its right and left ends held in the fixation groove 48 of the right and left frame portion 40. Then the mouth of the window fixation groove 74 is widened to allow the window fixation frame 70 to engage with the upper end of the transparent window 2. The right and left rails 60 are mounted on the upright portions 57 of the rail receivers 52 of the right and left frame portions 40, which rails are secured with the rail holders 87 of the right and left style frames 82. The hand rail 80 is fixed so that the nail 86 of the front style frame 81 is in engagement with the engaging groove 72 of the window fixation frame 70 and the right and left frame portions 40A and 40B are covered with the hand rail 80. The insulating box may be formed by injecting expandable insulating material into the space formed in between the inner and outer boxes.

Figure 10:
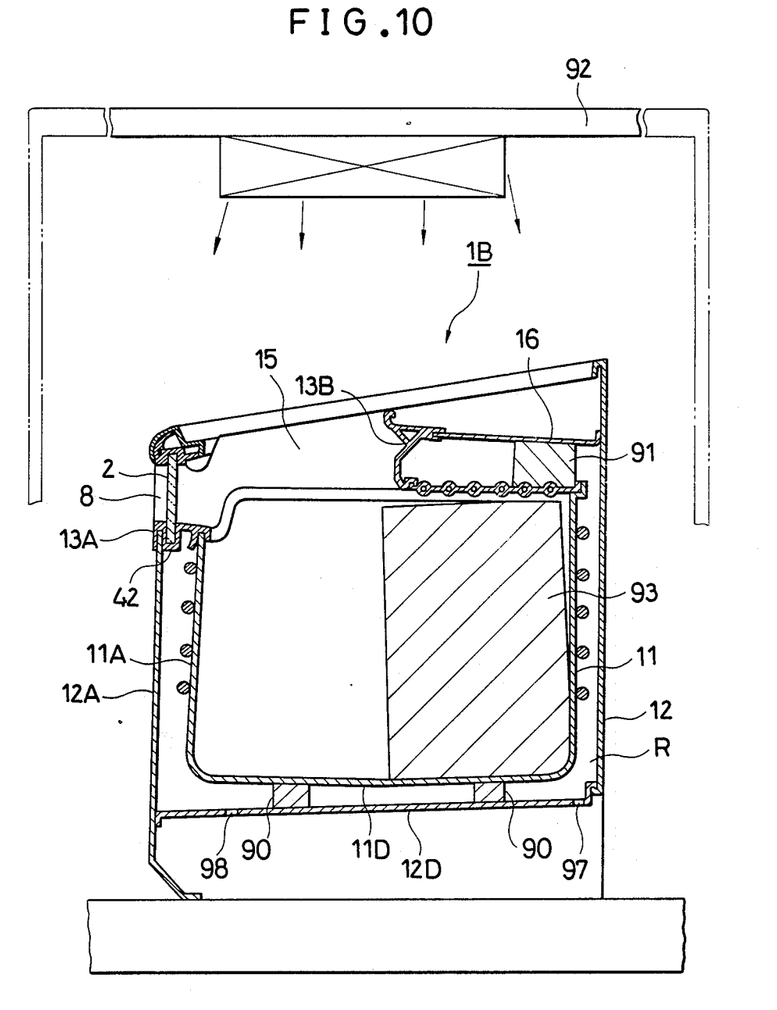
FIG. 10 shows the box of the low-temperature show case placed in a furnace and FIG. 11 shows the box secured on a jig.
Figure 11:
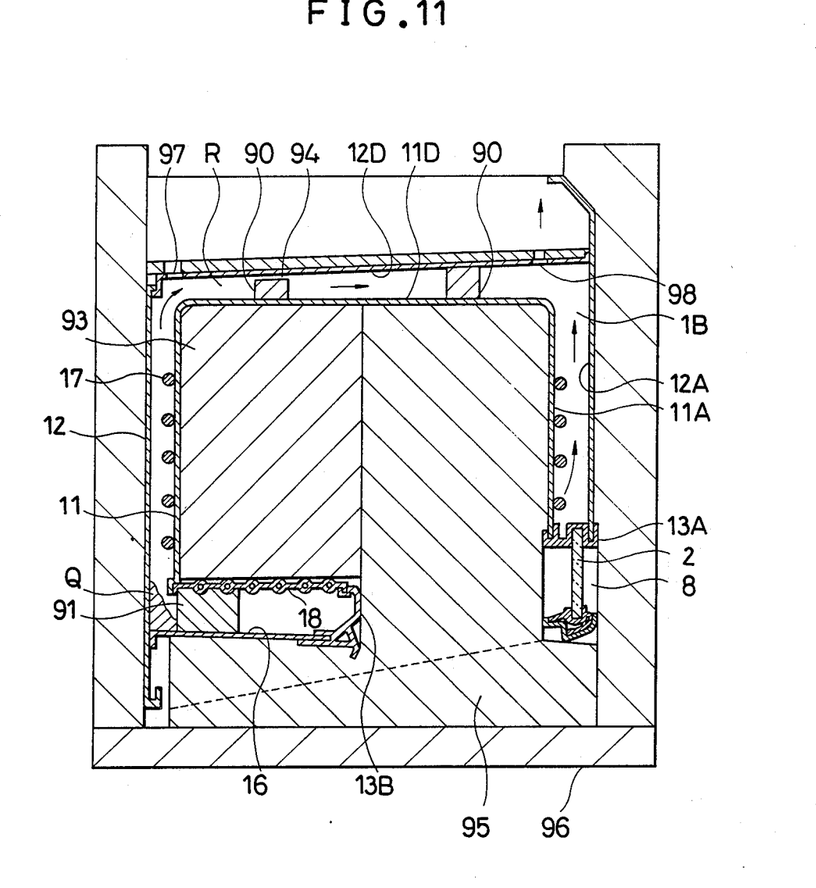

Referring to FIGS. 10 and 11, the method of manufacturing the insulating box stated above is now described.

A box 1B having an opening 15 in one side and a projecting wall 16 is formed by first gluing an insulating block 90 on the outer surface of the bottom 11D of the inner box 11, and second placing in position the inner box inside the outer box leaving appropriate space between them by means of the insulating block 90 and a partition member 91 in the space and by connecting the inner box 11 with the outer box 12 with the frame 13.

The multi-layer transparent panel is inserted into the groove 100 of the first frame portion 13A comprising the groove 42 and the fixation groove 48 along the edge of the recess 8, to thereby form the transparent window 2 in the recess 8. The box 1B is then moved into a furnace 92 and heated to a predetermined temperature. A liner 93 preheated to a predetermined temperature is then placed on the front half portion of the bottom wall 11D through the opening 15 from above, and then shifted to the rear until it comes below the projecting wall 16 as shown in FIG. 10. As the liner is shifted to the rear, the bottom wall 11D sags down towards the space R due to the weight of the liner until the insulating block 90 abuts the bottom wall 12D of the outer box. Then the gap 94 between the block 90 and the outer box will disappear.

After the liner is placed in the box as described above, the box is turned upside down with the liner kept therein. The box 1B is held firmly by means of internal and external holders 95 and 96 as shown in FIG. 11. The liner 93 and the internal and external holder 95 and 96 are collectively referred to as jig. As the box 1B is turned upside down as mentioned above, the weight of the liner 93 is supported by the inner wall of the projecting wall 16, which is a part of the auxiliary refrigeration apparatus 18. As a result, the bottom wall 11D of the inner box is released from the bottom wall 12D of the outer box, so that the sagging of the bottom wall 11D disappears and the gap 94 is restored as it was. Under this condition, liquid state expansion insulating material Q is injected from the injection hole 97 into the space R, which material will expand in the form of foam and grow into the entire space R in the direction indicated by the arrows in FIG. 11, expelling the air in the space R through the air passage 98 and forming an integral layer of insulating material, yielding said insulating box 1.

It should be apparent that the plastic members e.g. frame 13 are made of materials that are not deformed or melt at the preheating temperature. Since the liquid state expansion insulating material has better fluidity and better adhesion to the surface of the inner and outer boxes, it is preferable to set the preheating temperature for the box and the jig at the highest temperature possible.

The transparent window 2 may thus be firmly secured in the groove 42 in the recess and in the fixation groove 48 without using any other fixing members such as screws, by means of the front frame portion 41, right and left frame portions 40A and 40B, and the first frame portion 13A connecting the inner and outer boxes. By fitting the upper end of the transparent window engaged in the window fixation groove 74 of the window fixation frame 70, the frame 70 may be fixed also. Since the resilient window fixation groove 74 provides strong the grip holding the upper end of the transparent window 2 therein, other fixing members such as a screw is not needed either. By fitting the right and left rails 60 on the right and left frame portions 40A and 40B, respectively, and covering the right and left rails 60 and the window fixation frame 70 by means of the hand rail 80, the frame 70 and the rails 60 may be secured without using any other fixing member e.g. screws except for securing the hand rail 80 on the outer box 12. Thus, the transparent window 2 and its surrounding members may be secured through simple engagement or fitting, and hence fewer fixing components are required. Since the insulating material is injected into the assmebled box, the transparent window 2 and the hand rail 80 prohibit bulging of the walls near the recess and the upper opening, so that one can avoid conventional problems that the transparent window and/or the hand rail cannot be mounted in position due to the narrowing of the recess or the upper opening. The formation of the box is completed when the expansion of the insulating material is done.

Since, prior to the injection of the liquid state expansion insulating material Q into the box 1B, the multi-layer transparent panel 2 is already installed in the groove 42 and the fixation groove 48 of the first frame portion 13A and since the resultant box 1B is preheated in the furnace 92, the pressure of the expanding material does not distort the frame 13 or the transparent window, but instead the multi-layer transparent panel 2 may be fixed firmly. Although the air in the insulating space of the multi-layer transparent panel expands as it is heated by the liner and by the preheating, the pressurized air is allowed to escape outside through the pressure adjusting air passage 2E, so that the internal pressure of the air forcing the transparent panel outwardly is sufficiently reduced and so is the buckling of the place, thereby preventing cracking of the multi-layer transparent panel caused by the heating. To finish the insulating box, no further process is needed after the completion of the injection of the insulating material into the box 1B. Therefore, the efficiency of manufacturing the insulating box is increased in this method. Incidentally, the pressure adjusting air passage 2E may be sealed after the completion of the injection of the insulating material.

Next, the preheating mentioned above is briefly described. The predetermined temperature (which is hereinafter referred to as permissible preheating temperature) should be below the cracking temperature which is defined as that temperature at which the multi-layer transparent glass 2A will be cracked due to the expansion of the heated air inside the plate. The permissible preheating temperature can be calculated from the dimensions of the rectangular transparent panel; short side a, long side b, and thickness t of the glass, and the interval x of the glass layers (in unit of cm).

In this example, the pressure P during heating is given by $$P = \{t^2 x (\text{permissible stress of the glass})\} / \{(\text{first coefficient in terms of } b/a) \, xa^2\} \ldots, \quad (1)$$

buckling $\delta$ by $$\delta = \{(\text{second coefficient in terms of } b/a) \, xPxa^4\} / \{(\text{Young's modulus of glass}) \, xt^3\} \ldots, \quad (2)$$

the radius r of the buckling by $$r = \{\delta^2 + (a/2)^2\}/(2.8) \quad (3),$$

the volume of the expanded air (assuming the expansion of both surfaces) by $$V = \frac{r^2}{2} \left( \pi \times \frac{\theta}{180} - \sin\theta \right) \times b \ldots, \quad (4)$$

and from these four equations the cracking temperature $T_2$ is given by $$T_2 = P_2 V_2 T_1 / P_1 V_1 = (P + P_1)(V + V_1) T_1 / P_1 V_1 \quad (5)$$

where $\theta$ is the angle of buckling in the direction of the short side, $T_1$, $P_1$, and $V_1$ are the temperature, pressure of the air layer, and the volume of the air layer, respectively, measured at the time of manufacturing the transparent panel.

The cracking temperature $T_2$ was calculated for three exemplary cases of $a = 11, 15, 25$ for which the ratio $b/a$ exceeds 5, and permissible stress of the glass is 250 [kg/cm$^2$], first coefficient in terms of $b/a$ is 0.75, second coefficient in terms of $b/a$ is 0.147, Young's modulus of the glass $= 7.5 \times 10^5$ [kg/cm$^2$], $b = 125$, $t = 0.28$, $x = 0.61$, $P_1 = 1.03$ [kg/cm$^2$], $T_1 = 300°$ K.; and for three cases of $a = 11, 15, 25$ in which $b/a$ is less than 5 with the first coefficient $= 0.74$, the second coefficient 0.144, and $b = 65$. The results are as follows:

(i) For $b = 125$ and $a = 11$, $$T_2 = Z = 374.1 \, [°K.] = 101.1 \, [°C.]$$

(ii) For $b = 125$ and $a = 15$, $$T_2 = 352.98 \, [°K.] = 79.98 \, [°C.]$$

(iii) For b=125 and a=25, $T_2 = 361.9 \; [°K.] = 88.9 \; [°C.]$ (iv) For b=65 and a=11, $T_2 = 374.9 \; [°K.] = 101.9 \; [°C.]$ (v) For b=65 and a=15, $T_2 = 353.3 \; [°K.] = 80.3 \; [°C.]$ (vi) For b=65 and a=25, $T_2 = 361.8 \; [°K.] = 88.8 \; [°C.]$ From these results $T_2$ was anticipated to have a minimum, which was found by a numerical method to be about 77° C. when the short side is about 17.8 [cm].

Taking into account a safety factor the craking temperature of the multi-layer transparent panel for x=0.61 [cm] is taken to be 10° C. lower than the calculated temperature.

Figure 12:
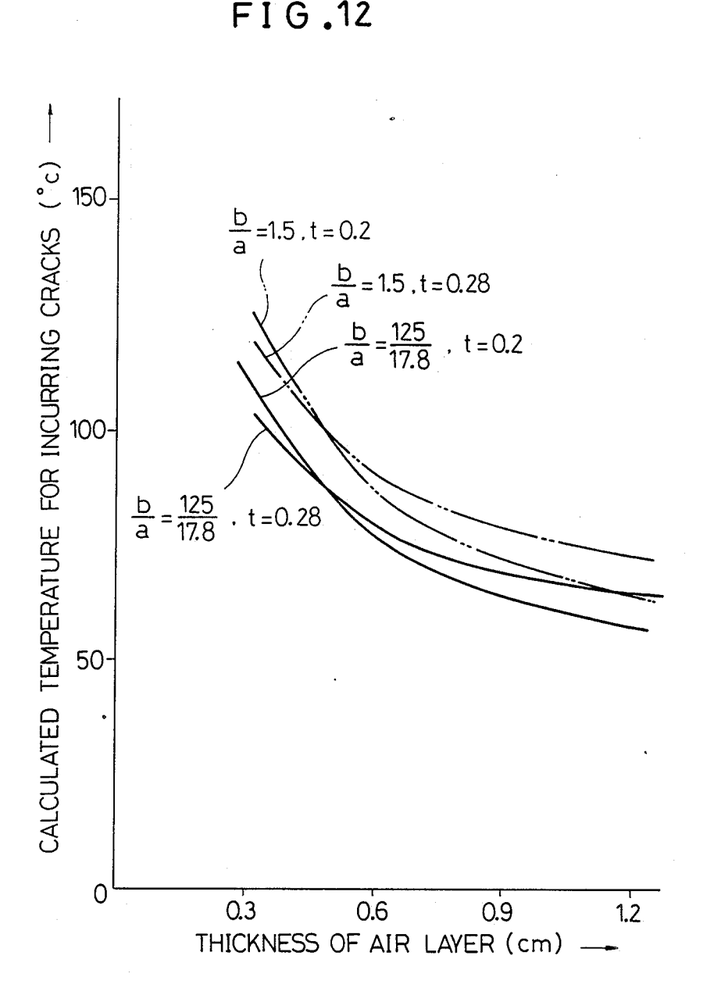
FIG. 12 shows the relationship between the thickness of the air layer in the multi-layer transparent panel and the cracking temperature thereof.

The cracking temperature lowers as the thickness of the air inside the panel becomes thicker, as shown in FIG. 12. The value of a of this Figure is chosen such that the calculated cracking temperature becomes minimum. In actuality, the cracking temperature is assumed to be 10° C. lower than the calculated temperature (specifically, about 67° C. in this example), and the heating temperature in the furnace is chosen at further lower temperature of 60° C. for safety. Injection of the expandable material at 60° C. resulted in no cracks in the multi-layer transparent panel.

Since the multi-layer transparent panel 2 is inserted in the groove 42 and the fixation groove 48 of the first frame portion 13A, and since the resultant box 1B is preheated in the furnace 92 prior to the injection of the liquid state expansion material Q into the box 1B, the multi-layer transparent panel 2 may be fixed firmly without distorting the frame 13 or the transparent window by the pressure of the expanding material. Further, since the preheating temperature is chosen below the cracking temperature of the multi-layer transparent panel 2 (i.e. the temperature at which cracking can be avoided), the expansion of the air in the transparent panel is reduced and the outward buckling of the transparent panel may be suppressed within a safe limit.

Likewise, in the case where a multi-layer transparent panel 2 is provided with a pressure adjusting air passage, an increment of pressure and expanded volume of the air in the transparent window 2 due to heating is also reduced to prevent cracking in the transparent panel. This also improve the efficiency of manufacturing the insulating box.

What is claimed is:

1. An insulating box for a low-temperature show case having an upper opening, comprising:
    an inner box and an outer box spaced apart from each other;
    a frame covering, and extending between, the edge portions of said inner and outer boxes to enclose the space between them;
    a recess formed in the upper front end of said insulating box;
    a transparent panel inserted into groove portion formed in said frame, said frame extending along said recess;
    a thermally insulating material injected and expanded in said space between said inner and outer boxes after said frame and transparent panel were secured in position.

2. An insulating box as defined in claim 1, wherein the recess has an open end and three edges, and the frame has a groove for receiving said three edges of said transparent panel.

3. An insulating box as defined in claim 1, wherein said frame has, in the inner wall thereof facing said space, a portion for receiving a part of the insulating material.

4. An insulating box as defined in claim 1, wherein said groove portion of the frame is formed to extend into the space between the inner and outer boxes.

5. An insulating box as defined in claim 1, wherein the recess is provided with a fixation frame for receiving the remaining onee edge of the transparent panel, said three edges not facing the frame.

6. An insulating box as defined in claim 5, wherein the upper ends of the fixation frame, front walls of the inner and outer boxes, and the right and left walls are covered with a hand rail.

7. A method of manufacturing an insulating box for a low-temperature show case having an upper opening, comprising steps of:
    forming a recess in the upper ends of the front walls of inner and outer boxes;
    forming a box comprising said outer box, said inner box placed in, but spaced apart from, said outer box, and a connecting frame for connecting the upper ends said inner and outer boxes;
    injecting expandable insulating material into the space between said inner and outer boxes after a transparent panel is secured in said recess.

8. A method of manufacturing an insulating box as defined in claim 7, wherein, prior to the injection of the insulating material, said box having the transparent panel installed in the recess is preheated to a predetermined temperature below the cracking temperature of the transparent panel, and is fixed on a jig which is also heated to the predetermined temperature.

9. A method of manufacturing an insulating box as defined in claim 8, wherein said transparent panel is a multi-layer transparent panel made up of a multiplicity of spaced apart transparent panels.

10. A method of manufacturing an insulating box as defined in claim 9, wherein, prior to the injection of the insulating material:
    the opening defined by the edges of the recess is covered with a frame, closing the space between the inner and outer boxes;
    said multi-layer transparent panel is installed in the groove portion formed in said frame covering the opening;
    the edge of the transparent panel other than those received in the groove portion in the recess is fixed with a fixation frame;
    the upper ends of the fixation frame, front walls of the inner and outer boxes, and the right and left walls are covered with a hand rail; and further comprising steps of:
    preheating said box having the transparent panel installd in the recess to a predetermined temperature below the cracking temperature of the transparent panel; and fixing said preheated box on a jig which is also heatd to the predetermined temperature.

11. A method of manufacturing an insulating box as defined in claim 7, wherein, prior to the injection of the insulating material:

said transparent panel is a multi-layer panel made up of space apart transparent panels installed in said recess, leaving an insulating space of air between each pair of said transparent panels;

a pressure adjusting air passage is provided in the transparent panel, for communicating the insulating space with the atmosphere; and further comprising steps of:

heating the box to a predetermined temperature; and fixing the box on a preheated jig.

12. A method of manufacturing an insulating box as defined in claim 7, wherein, prior to the injection of the insulating material:

the opening defined by the edges of the recess is covered with a frame, closing the space between the inner and outer boxes;

said multi-layer transparent panel is installed in the groove portion formed in said frame covering the opening;

the edge of the transparent panel other than those received in the groove portion is covered with a fixation frame;

the upper ends of the fixation frame, front walls of the inner and outer boxes, and the right and left walls are covered with a hand rail; and further comprising a step of preheating said box having the transparent panel installed in the recess to a predetermined temperature below the cracking temperature of the transparent panel;

fixing the box on a jig preheated to said predetermined temperature.

* * * * *